April 24, 1945. E. RAVNDAL ET AL 2,374,456
APPARATUS FOR EXTRACTING FRUIT JUICES
Filed Aug. 2, 1941 3 Sheets-Sheet 1

Inventors
Eric Ravndal
Alexander P. Fothergill
By Cushman, Darby, Cushman
Attorneys

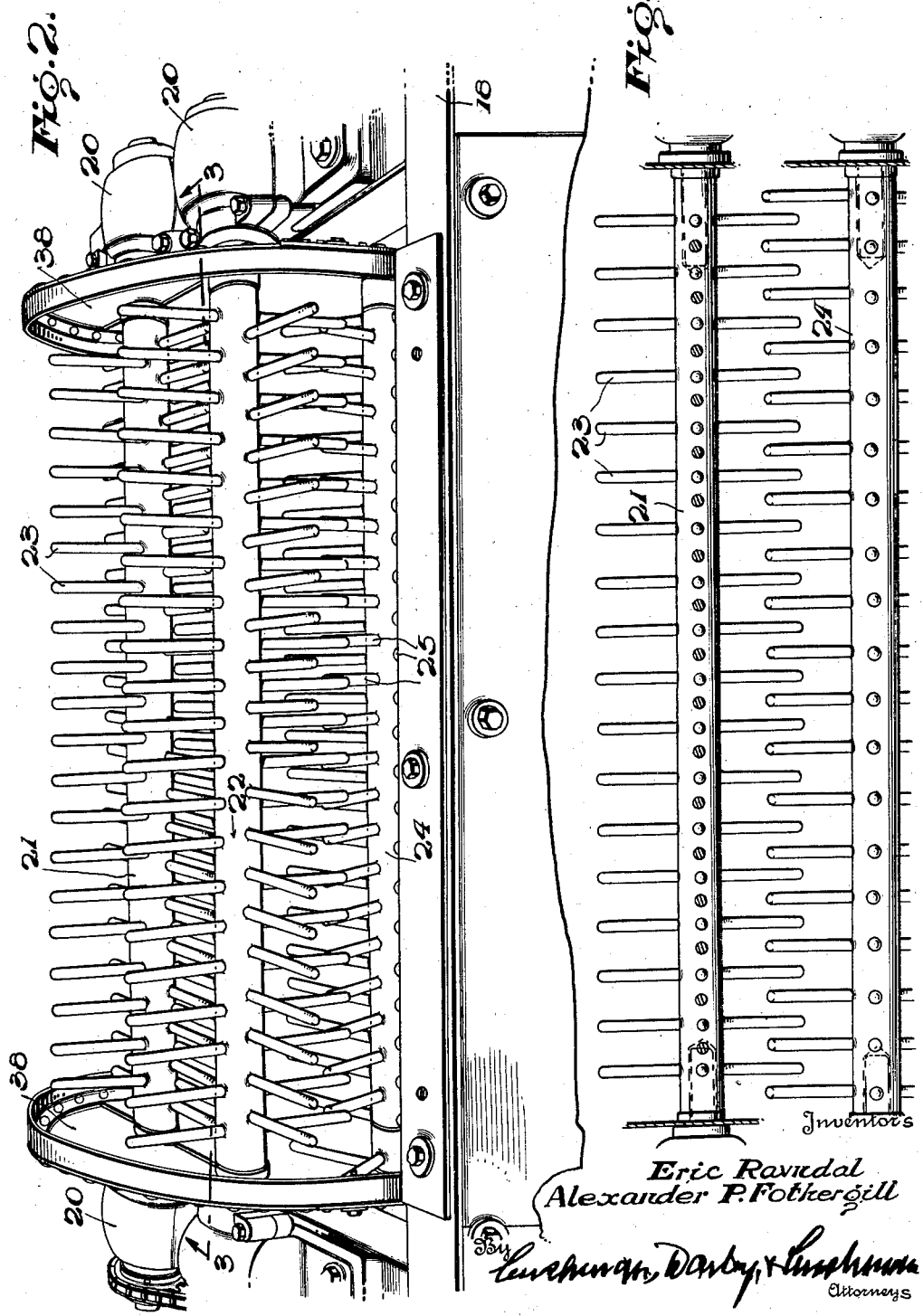

April 24, 1945.　　　E. RAVNDAL ET AL　　　2,374,456
APPARATUS FOR EXTRACTING FRUIT JUICES
Filed Aug. 2, 1941　　　3 Sheets-Sheet 3
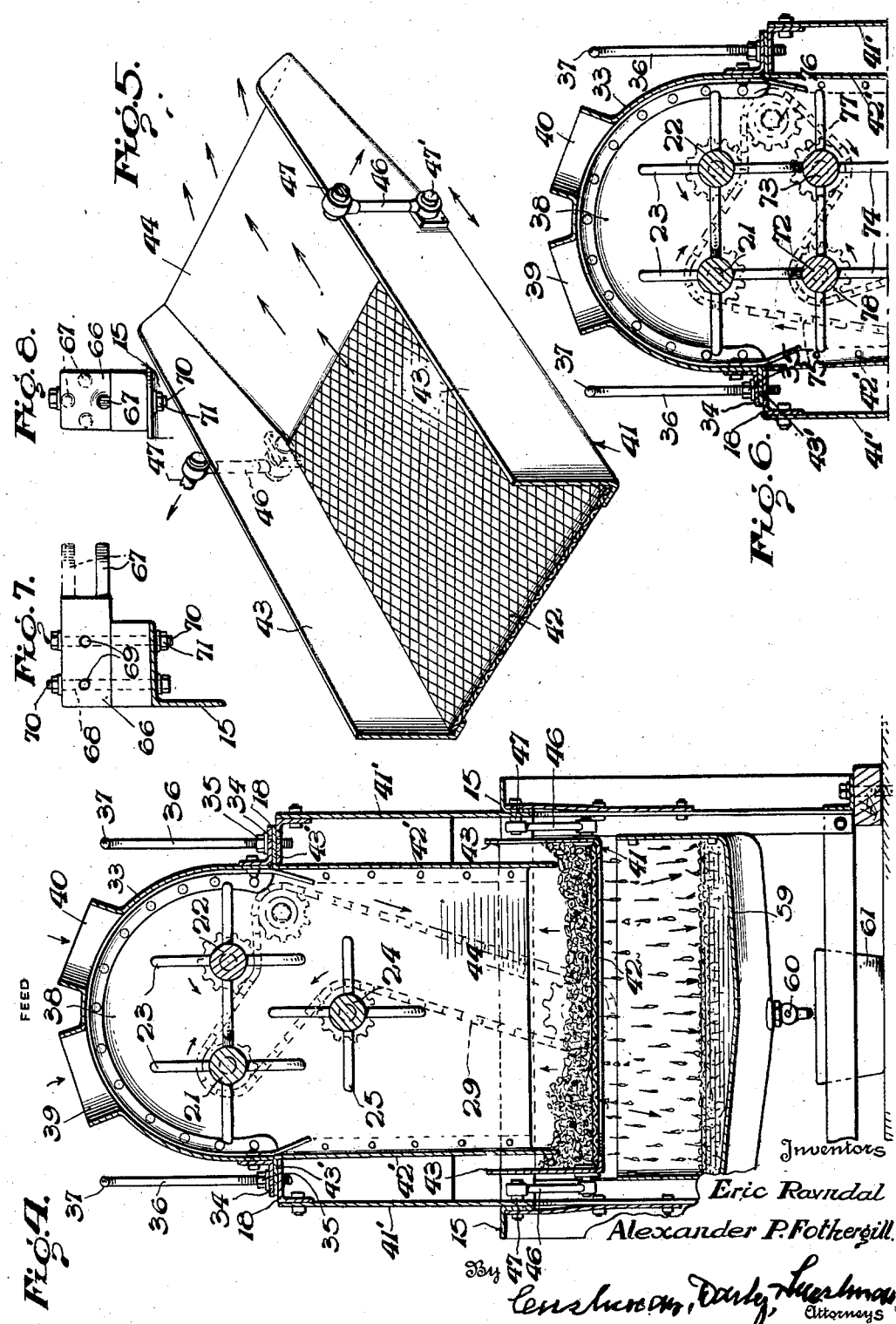

Patented Apr. 24, 1945

2,374,456

UNITED STATES PATENT OFFICE 2,374,456

APPARATUS FOR EXTRACTING FRUIT JUICES

Eric Ravndal and Alexander P. Fothergill, Orlando, Fla., assignors of three-fourths to said Ravndal and one-fourth to said Fothergill Application August 2, 1941, Serial No. 405,250

7 Claims. (Cl. 146—3)

The present invention relates to an apparatus for extracting fruit juices and more particularly citrus fruit juices.

An object of the invention is the provision of an apparatus for extracting juice from the peel, pulp, seeds, and other component parts of citrus fruit, whereby the extracted juice will be substantially free of the essential oils, terpenes, and other bitter elements contained therein. Thus, a tastier and more desirable juice is provided, leaving the residue in such a condition that it can be used in any desired manner.

In the extraction of citrus fruit juices, we have found that in many prior art processes and machines, there is a crushing, mashing, pressing, and batting of the peeled or unpeeled fruit, which causes the extracted juice to contain essential oils and other bitter and undesirable constituents. The present invention is designed to eliminate this objectionable feature by providing a process and apparatus wherein disintegration of the fruit is permitted without cracking the seeds or crushing the rag.

One means for carrying out this process comprises the employment of a pair of oppositely rotated shafts, each having a plurality of rows of radially extending pins which overlap and intermesh with the pins of the other shaft. These pins are of considerably greater length than the diameters of the shafts, whereby the fruit, either peeled or unpeeled, is entirely disintegrated by the action of the intermeshing pins. The shafts are sufficiently spaced from each other to prevent the rag from being crushed or the seeds from being cracked therebetween as the fruit is fed through the apparatus, and the intermeshing pins also are sufficiently spaced longitudinally of the shafts to effect a disintegrating action which separates the juice and pulp from the seeds, peel, and other inedible elements without a crushing or pressing action such as would cause the extraction of bitter or undesirable juice. While the majority of the seeds will be thrown away from the center of the apparatus, as will be hereinafter described, those seeds which are drawn between the shafts will not be crushed or broken, due to the clearance of the intermeshing pins.

Another object is to employ a cover or hood enclosing the disintegrating members and provided with a pair of inlet spouts, each positioned outwardly from the axis of one of the shafts, whereby the fruit is initially delivered to the outer sides of the members where it is preliminarily acted upon by the fingers or pins of its respective member as it is thrown toward the center of the disintegrating area between the shafts. Thereafter, the partially disintegrated fruit will be drawn downwardly and completely disintegrated by the intermeshing fingers or pins, without any crushing of the rag or cracking of the seeds, due primarily to the clearance between the pins which will disintegrate the fruit without such crushing or cracking action. The rotation of the pins will cause a strong down draft of air between the shafts which assists in the disintegrating operation.

A further object is to provide a juice extracting apparatus including a movable screening or juice separating member having an upwardly inclined imperforate residue discharge section wherein the residue which is separated from the juice is gradually moved away from the perforated section at a rate sufficiently slow to permit substantially all of the juice to be separated from the residue before the latter is finally discharged from the separating member.

Another object is to provide an improved operating mechanism for rotating the shafts and reciprocating the screening or separating member.

With the foregoing and other objects in view, the invention will now be more fully described, reference being had to the accompanying drawings, in which:

Figure 2 is a side view of the disintegrating members.

Figure 3 is a section taken on line 3—3 of Figure 2.

Figure 4 is a section taken on line 4—4 of Figure 1.

Figure 5 is a fragmentary view showing the outer portion of the screening or separating element.

Figure 6 is a fragmentary vertical section of a modified form of the invention.

Figure 7 is a side elevation of one of the lever supporting blocks, and

Figure 8 is an end view of the block shown in Figure 7.

Figure 1:
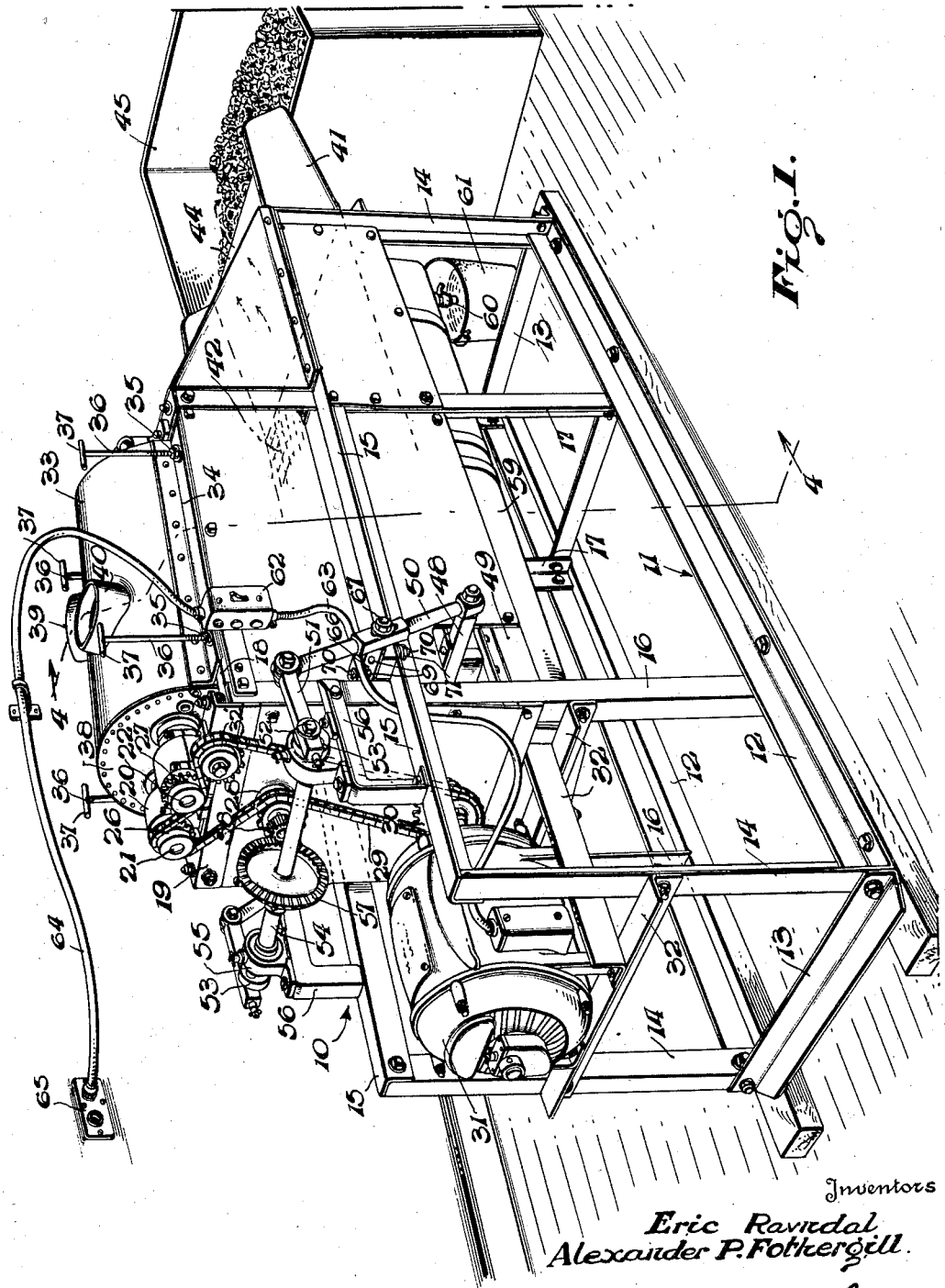
Figure 1 is a perspective view of the present invention.

Referring now to Figure 1 of the drawings, the numeral 10 designates generally the present juice extracting apparatus. This apparatus may be supported above the ground or floor line in any desired manner, and in the present instance the supporting means comprises a base 11 consisting of longitudinally extending rails 12 and transverse cross bars 13 connecting the rails 12. A plurality of vertically extending posts 14 project upwardly from the base 11 at opposite ends of the base and are connected at their upper ends by longitudinally extending rails 15.

At spaced points between the posts 14 are pairs of intermediate posts 16 and 17 which are of greater length than the posts 14 and which are connected by sets of longitudinal and cross rails 18 and 19, respectively. These posts and rails 16, 17, 18, and 19 form the framework for supporting the fruit disintegrating mechanism which will now be described in detail.

Supported upon the cross bars 19 are sets of bearings 20 within which are journaled a pair of shafts 21 and 22, respectively. These shafts are relatively small in diameter and upon each shaft are mounted a plurality of rows of disintegrating fingers or pins 23. Referring particularly to Figures 2, 3, and 4, it will be observed that there are four rows of pins on each shaft, and each row is equidistant from the others, so that the pins in one row are positioned at right angles to the pins of its adjacent rows. The pins are of considerably greater length than the diameters of the shafts and the shafts are so spaced that a row of pins on one shaft will overlap a row of pins on the other shaft throughout the greater portion of the lengths of the pins (see Figures 2 and 4). The pins, furthermore, are spaced from each other to such an extent that when one row overlaps or intermeshes with a row of pins on the other shaft, there will be sufficient space between adjacent pins to permit the passage of seeds, rag and peel without breaking the seeds or substantially crushing or mashing the rag and peel sufficiently to free any of the essential oils which would tend to impair the flavor of the extracted juice. We have ascertained that the clearance between the intermeshing pins should be substantially three eighths of an inch to allow passage of the seeds, rag and peel or rind of oranges, without breaking or crushing the seeds or effecting such crushing action on the peel and rag which would release the essential oils. In addition to the shafts 21 and 22, there is provided a third shaft 24 (see Figure 4), which is mounted centrally of shafts 21 and 22 and sufficiently below these shafts to allow just the ends of the pins 25 of this latter shaft to overlap the ends of the pins 23. The pins 25 provide a final disintegrating action to the fruit after it is substantially disintegrated and passes through the intermeshing pins 23.

Shafts 21 and 22 are designed to rotate in opposite directions as shown by the arrows in Figure 4 and the means for effecting this rotation comprises a chain and sprocket mechanism. Referring particularly to Figure 1, it will be observed that sprocket gears 26 and 27 are fixedly mounted on the ends of the shafts 21 and 22. A sprocket gear 28 is likewise secured to the same end of the shaft 24 and a sprocket chain 29 rotates over and in engagement with these gears. This sprocket chain 29 at its lower end also engages a sprocket gear 30 mounted upon the shaft of a motor 31. This motor is mounted upon relatively short rails 32 connected to posts 14 and 16. The sprocket chain passes from the gear 30 upwardly and around sprocket gear 28, then up and around sprocket gear 26, then downwardly and under sprocket gear 27, whereby the shafts 21 and 22 will be rotated in opposite directions. Before passing back to the driving gear 30 mounted on the motor shaft, the chain passes around an idler sprocket roller 32', which is positioned to one side of and slightly below sprocket gear 27. This idler 32' makes it possible to direct the chain in such a way as to rotate the two shafts in opposite directions and also serves to take up the slack in the chain. It will also be observed that this arrangement places the long side of the sprocket chain on the pull side of the motor, and thus avoids having it on the push side.

Referring to Figures 1, 2 and 4, the numeral 33 designates a substantially semi-cylindrical hood or casing which encompasses the greater portion of the upper shafts 21 and 22 and pins 23. This hood is provided with flanges 34 at each side which are supported upon the rails 18, being secured thereto by suitable lock bolts 35. These bolts are extended upwardly to provide elongated stems 36 and handle portions 37 to facilitate the unscrewing of the bolts and the removal of the hood when it is desired to gain access to the shafts and pins of the disintegrating mechanism. The hood 33 is provided with semi-circular end sections 38 having spaced openings for the shafts 21 and 22.

Referring particularly to Figure 4, it will be observed that the lower sides of the hood are spaced slightly from the outer extremities of the pins 23. Upon opposite sides of the top center of the hood are located inlet openings 39 and 40 for the introduction of either peeled or unpeeled fruit. Due to the fact that these openings are spaced laterally and longitudinally of the hood, the fruit is well distributed over the pins. Furthermore, since these openings are positioned to one side of the center line of the hood, the fruit is not dropped directly into the space between the shafts 21 and 22. In other words, the fruit is first introduced to the disintegrating mechanism and contacts the pins of a shaft adjacent one side of the hood, depending upon which inlet opening is used. With this construction, there is a preliminary disintegrating action before the fruit is thrown toward the center of the disintegrating area between the shafts 21 and 22. This preliminary disintegration releases the majority of the seeds from the fruit, and since the seeds are of substantially greater weight than the rest of the parts which go to make up the fruit, they will be thrown outwardly away from the main disintegrating area and follow the contour of the hood, dropping clean and uncracked to a screening mechanism 41, without passing between the shafts 21 and 22. The few seeds which are drawn into the disintegrating area between the shafts 21 and 22 will, however, not be broken or cracked, due to the clearance between the intermeshing pins.

The present invention is designed to accommodate either peeled or unpeeled fruit. If unpeeled fruit, such as oranges, are introduced through the inlet openings 39 and 40, they will be initially broken up upon opposite sides of the hood and then most of the particles, with the exception of the majority of the seeds as above noted, will be thrown into the area between the shafts 21 and 22 and drawn forcibly downward by the intermeshing pins 23. The particles are then caught in the whirl of the shaft 24 and pins 25, and thrown violently outward to the sides of the machine in a wholly disintegrated condition where the juice and residue fall to the screen 41. The disintegration is substantially instantaneous, and upon examination the residue will be found to contain large sections of rind or peel, with portions of the membranes still attached, but with the juice cells and seeds completely separated and removed.

When peeled fruit is introduced into the inlet openings 39 and 40, the same action will take place as noted above. That is, the seeds and membranes will be separated from the juice cells without cracking the seeds or crushing the membranes. Thus, the present construction effects a complete disintegration of peeled or unpeeled fruit without any crushing or pressing of the peel, seeds or other elements which would tend to release essential oils or other undesirable material which would otherwise impair the taste of the juice.

It will be observed that there is no crushing or mashing of the fruit by the shafts 21 and 22, due primarily to the fact that the diameter of these shafts are considerably smaller than the lengths of the pins 23. Thus, the intermeshing pins effect substantially all of the disintegration of the fruit. These pins, as shown in the drawings, are preferably round in cross-section, and have no sharp edges or sides which would tend to crush or break the seeds, and other fruit elements.

Aside from the fact that the complete disintegration of the fruit is primarily due to the arrangement of the pins whereby sufficient clearance is provided to prevent crushing, mashing or breaking of the peel, seeds and other elements of the fruit, we have found that the action of the pins 23 rotating in opposite directions (see Figure 4), sets up a strong force of air or downdraft which tends to draw the fruit downwardly past the shafts 21 and 22 and assists in the disintegrating action. Due to the fact that the pins pass each other at the center point, they produce a fan-like action in forcing the air downward in the middle space between the shafts. This downdraft is broken up or interrupted when it reaches the pins 25. These pins, therefore, not only produce a final disintegrating action on the fruit, but also prevent the disintegrating fruit from being deposited at one point on the screens. In other words, the pins 25 intercept the substantially disintegrated fruit and scatter it so that it is not concentrated at one particular spot on the screen.

Referring to Figure 4, it will be observed that the sides of the frame below the hood 33 are enclosed by outer plates 41' which are mounted between the posts 16 and 17, and the rails 18 and 19 and are designed to exclude dirt and insects. The fruit in its finally disintegrated form drops down upon the screen 41. This screen 41 consists of a perforated bottom or floor 42 and imperforate side walls 43. At one end of the screen 41 there is an imperforate upwardly inclined area 44 which joins the perforated floor 42. The screen is suitably supported below the shaft 24 so that it will reciprocate or oscillate during the rotation of the shafts. This oscillation of the screen not only jostles the residue so that any juice adhering to the same will be separated therefrom, but it also gradually moves the residue toward the inclined section 44. By the time that the residue reaches the section 44 substantially all of the juice will have been separated therefrom and it will then be gradually forced up the inclined end and finally discharged into a bin or box 45.

A set of inner plates 42' are spaced inwardly of the plates 41' and extend downward inside the flanges 43 of the screen 41, terminating a short distance above the floor 42. The upper ends of the plates 42' extend outwardly to form flanges 43' which are clamped between the flanges 34 and rails 18. These plates 42' thus form a continuation of the hood or hopper 33 and constitute a chute directing all the disintegrated parts of the fruit to the oscillating screen 41. As shown in Figure 4 these plates are slightly inclined downwardly and inwardly. They preferably extend to within an inch of the screen except at the discharge end where more clearance is allowed for free passage of the residue to box 45.

The means for effecting the reciprocation or oscillation of the screen 41 is as follows: The screen is pivotally supported adjacent its discharge end to a pair of rods or links 46. One end of each link is pivotally connected to one of the walls 43 while the other end is pivotally mounted on a stub shaft or pin 47 secured to one of the rails 15. At the extreme inner end of the screen is mounted a cross bar 48 which projects through suitable openings 49 at opposite sides of the frame structure. The opposite ends of this rod are pivotally connected to a pair of levers 50, each of which is pivotally mounted intermediate its ends upon the frame structure adjacent its respective rail 15. The upper end of each lever 50 is pivotally connected to a link 51 which in turn is pivotally connected to a pin 52 fixed to an eccentric 53. Each eccentric is fixed to a shaft 54 mounted in bearings 55 supported upon an auxiliary frame member 56 which is connected to the posts 16 and rails 15. A large bevel gear 57 is fixed centrally of and to the shaft 54 and meshes with a pinion 58 mounted on the end of shaft 24 directly in front of the sprocket gear 28.

With this construction, when the motor 31 is operated to rotate the several sprocket gears, rotation will also be imparted to the shaft 24 through the bevel gear 57 and pinion 58. By reason of the eccentrics 53, the lever 50 will be moved about its pivot and this action will impart an oscillating or reciprocating motion to the screen 41.

The extracted juice eventually falls into a pan 59 having an inclined bottom so that the juice will flow downwardly to the discharge end thereof. At this point, a valve or spigot 60 is located so that the juice may flow into a bucket or other receptacle 61. A switch 62 or other suitable control means is mounted on the frame and this is connected to the motor 31 by means of the cable or cord 63. Another cable 64 is connected to the switch 62 and is designed to be plugged into any suitable wall plug or other electrical outlet 65, whereby the apparatus is ready for instant use.

Referring to Figures 7 and 8, there is shown means for adjusting one end of the screen 41 so as to control the speed of discharge of the residue up the inclined area 44. This means comprises a pair of blocks 66 detachably mounted on opposite sides of the frame. Each block is provided with an integral stub shaft 67 constituting the pivot for one of the levers 50. Each block 66 is also formed with two sets of transverse holes 68 and 69, respectively, one set extending at right angles to the other as clearly shown in Figure 7. With this arrangement, and assuming the blocks are in the position shown in the drawings, the inner end of the screen will be in its lowermost position. The degree of inclination of the imperforate portion 44 will be greatest in this position of the blocks, so that the rate of discharge of the residue will be retarded. If it is desired to increase the speed of discharge of the residue, the bolts and nuts 70 and 71 are removed, and the blocks turned upside down, that is at an angle of 180° so that the shafts 67 will be in the dotted line position of Figure 7. This will raise the inner end of the screen 41, so that the portion 44 will swing downwardly about the stub shafts 47' as a pivot. This will decrease the inclination of the area 44 and thus speed up the rate of discharge of the residue. If an intermediate speed is desired, the blocks 66 may each be turned on its side, so that the holes 69 are vertical. In this position, the stub shaft 67 will be located at an intermediate point centrally of the upper and lower ends of the block, as clearly shown in Figure 8. From a practical standpoint, it is immaterial whether the block is turned to the right or left to bring the shaft 67 to its intermediate position, since the inclination of the portion 44 will be substantially the same.

Referring to Figure 6, there is disclosed a modified form of the invention which is designed to accommodate heavy citrus fruits, such as grapefruit. While the construction shown in Figures 1 to 5 could be used to extract grapefruit juice, it is particularly designed to accommodate oranges. This apparatus illustrated in Figure 6, is the same as the other form, except that a pair of lower shafts 72 and 73 are substituted for the single shaft 24. The pins 74 are the same shape and size as the pins 23. The sprocket chain 75 is so arranged that after passing around idler gear 76, it passes under gear 77 fixed to shaft 73, and then up and over gear 78 fixed to shaft 72. The chain then passes to the motor (not shown).

As illustrated by the arrows in Figure 6, this arrangement of the chains and gears rotate the upper shafts in the same direction as that shown in Figure 4. That is, the pins 23 feed the fruit, as it is being disintegrated, downwardly between the shafts 21 and 22. Shafts 72 and 73, rotating in opposite directions to shafts 21 and 22, therefore move the pins 74 upwardly and outwardly. This has the effect of breaking up the downdraft between the shafts caused by the rotation of the pins 23, so that the disintegrated fruit will not be thrown downwardly at one concentrated spot on the screen. The pins 74 will take the substantially disintegrated fruit and throw it outwardly to opposite sides of the machine where it will be distributed throughout a substantial area of the screen. The pins 74 and 23 may overlap each other to any desired degree. Since the upper run of pins of shaft 72 will be rotating in the same direction as the lower run of pins on shaft 21, both sets of pins will tend to throw the disintegrated fruit outwardly to one side of the machine. This will also be true of the intermeshing pins 23 and 74 of shafts 22 and 73.

While the above described modifications are the preferred ones, it is to be understood that the number of lower shafts and pins may be increased, if desired. It is to be further understood that the invention is not limited to the details of construction shown in the drawings and described in the specification, and that the phraseology employed in the specification is for the purpose of description and not of limitation.

We claim:

1. An apparatus for extracting citrus fruit juices comprising a horizontally disposed casing, a pair of shafts journalled in said casing, a plurality of rows of pins secured to each shaft, the lengths of said pins being greater than the diameters of said shafts, the pins of one shaft being positioned in staggered and overlapping relation to the pins of the other shaft, the pins of one shaft overlapping those of the other shaft throughout the greater portion of their lengths and being spaced therefrom longitudinally of the shafts sufficiently to effect a disintegration of the fruit and freeing of the juice without breaking or cracking the seeds or crushing the peel and rag as would cause the release of oil or other bitter constituents, the top of said casing constituting a substantially semi-cylindrical hood having a pair of inlet openings, each opening being located to one side of the center line of the hood whereby the fruit will drop upon the outside pins and be partially disintegrated, and means for rotating the shafts in opposite directions whereby the seeds will be separated and thrown in a path adjacent the walls of the hood while the other particles of the fruit will be thrown into the area between the shafts and completely disintegrated by the action of the overlapping pins of the shafts.

2. An apparatus for extracting fruit juices comprising a support, means carried by said support for effecting a disintegration of the fruit, a reciprocating separating member for receiving the disintegrated fruit, said member including a screened floor through which the juice is adapted to pass, said member having an imperforate portion connecting one end of the screened floor and inclined upwardly therefrom to form an outlet for the residue whereby the seeds and other residue of the disintegrated fruit will gradually move upon the inclined portion and eventually be discharged therefrom after substantially all of the juice has been drained threrefrom back upon the screened floor, and means for adjusting the screen to vary the inclination of the imperforate portion and change the speed of discharge of the residue.

3. An apparatus for extracting fruit juices comprising a support, means carried by said support for effecting a disintegration of the fruit, a reciprocating separating member for receiving the disintegrated fruit, said member including a screened floor through which the juice is adapted to pass, said member having an imperforate portion connecting one end of the screened floor and inclined upwardly therefrom to form an outlet for the residue whereby the seeds and other residue of the disintegrated fruit will gradually move upon the inclined portion and eventually be discharged therefrom after substantially all of the juice has been drained therefrom back upon the screened floor, means for reciprocating the screen including a lever having one end pivotally supporting one end of the screen, and a block having a stub shaft upon which the lever is pivotally mounted, and means for detachably mounting the block on the support to change the location of the stub shaft and vary the inclination of the imperforate portion of the screen.

4. An apparatus for extracting citrus fruit juices comprising a casing, substantially closed at its top, a pair of shafts journalled in said casing, a plurality of rows of pins secured to each shaft, the lengths of said pins being greater than the diameters of said shafts, the pins of one shaft being positioned in staggered and overlapping relation to the pins of the other shaft, the pins of one shaft overlapping those of the other shaft throughout the greater portion of their lengths and being spaced therefrom longitudinally of the shafts sufficiently to effect a disintegration of the fruit and freeing of the juice without breaking or cracking the seeds or crushing the peel and rag to such an extent as would cause the release of oil or other bitter constituents, the top of said casing having a pair of inlet openings, the lower end of said casing being entirely open, and a reciprocating separating screen mounted below the open end of the casing and having side walls positioned exteriorly of and overlapping said lower end of the casing to thereby receive the disintegrated fruit.

5. An apparatus for extracting citrus fruit juices comprising a support, a pair of shafts journalled in said support, a plurality of rows of pins secured to each shaft, the lengths of said pins being greater than the diameter of said shafts, the pins of one shaft being positioned in staggered and overlapping relation to the pins of the other shaft, the pins of one shaft overlapping those of the other shaft throughout the greater portion of their lenghs and being spaced therefrom longitudinally of the shafts, the clearance between the intermeshing pins being substantially three-eighths of an inch so as to effect disintegration of the fruit and freeing of the juice without cracking the seeds or crushing the peel and rag to such an extent as to release essential oils or other bitter constituents, and means for rotating the shafts in opposite directions.

6. An apparatus for extracting citrus fruit juices comprising a support, a pair of shafts of relatively small diameter journalled in said support, four rows of pins secured to each shaft, with each row positioned at substantially right angles to the adjacent rows on its shaft, the lengths of said pins being considerably greater than the diameter of said shafts, the pins of one shaft being positioned in staggered and overlapping relation to the pins of the other shaft, the pins of one shaft overlapping those of the other shaft throughout the greater portion of their lengths and being spaced therefrom longitudinally of the shafts, the clearance between the intermeshing pins being substantially three-eighths of an inch so as to effect disintegration of the fruit and freeing of the juice without cracking the seeds or crushing the peel and rag to such an extent as to release essential oils or other bitter constituents, and means for rotating the shafts in opposite directions.

7. An apparatus for extracting citrus fruit juices comprising a support, a pair of shafts journalled in said support, a plurality of rows of pins secured to each shaft, the lengths of said pins being greater than the diameter of said shafts, the pins of one shaft being positioned in staggered and overlapping relation to the pins of the other shaft, the pins of one shaft overlapping those of the other shaft throughout the greater portion of their lengths and being spaced therefrom longitudinally of the shafts, the clearance between the intermeshing pins being approximately the minimum distance which will effect disintegration of the fruit and freeing of the juice without cracking the seeds or crushing the peel and rag to such an extent as to release essential oils or other bitter constituents, and means for rotating the shafts in opposite directions.

ERIC RAVNDAL.
ALEXANDER P. FOTHERGILL.